(12) United States Patent
Schmidt (10) Patent No.: US 6,512,626 B1
(45) Date of Patent: Jan. 28, 2003

(54) COMPOSITE SHEETS WITH ELECTRICALLY SWITCHABLE OPTICAL PROPERTIES MADE OF LIGHT-SCATTERING BASE MATERIAL

(75) Inventor: Friedrich Georg Schmidt, Haltern (DE)

(73) Assignee: Creavis Gesellschaft fuer Technologie und Innovation mbH, Marl (DE)

( * ) Notice: Subject to any disclaimer, the term of this patent is extended or adjusted under 35 U.S.C. 154(b) by 0 days.

(21) Appl. No.: 09/763,023

(22) PCT Filed: May 5, 2000

(86) PCT No.: PCT/DE00/01455

§ 371 (c)(1),
(2), (4) Date: May 9, 2001

(87) PCT Pub. No.: WO00/77571

PCT Pub. Date: Dec. 21, 2000

(30) Foreign Application Priority Data

Jun. 16, 1999 (DE) .......................................... 199 27 359

(51) Int. Cl.[7] .......................... G02B 26/00; G09G 1/04; G09G 3/34; G01N 27/26
(52) U.S. Cl. .......................... 359/296; 345/25; 345/107; 204/450
(58) Field of Search .................................. 359/320, 296, 359/253, 452; 345/25, 105, 107, 108; 356/441; 427/213.3; 204/450, 485, 487, 490, 606

(56) References Cited

U.S. PATENT DOCUMENTS

| | | | | |
|---|---|---|---|---|
| 4,150,876 A | * | 4/1979 | Yevick | ......................... 349/25 |
| 5,699,097 A | | 12/1997 | Masami et al. | ............. 347/171 |
| 6,017,584 A | * | 1/2000 | Albert et al. | ............ 427/213.3 |
| 6,300,932 B1 | * | 10/2001 | Albert | ......................... 345/107 |

FOREIGN PATENT DOCUMENTS

WO   WO 99/56171   11/1999

OTHER PUBLICATIONS

Patent Abstracts of Japan, vol. 017, No. 204 (P–1524), Apr. 21, 1993, JP 04 345133, Dec. 1, 1992.

U.S. patent application Ser. No. 09/763,057, filed Apr. 23, 2001, pending.

U.S. patent application Ser. No. 09/763,023, filed May 9, 2001, pending.

\* cited by examiner

Primary Examiner—Georgia Epps
Assistant Examiner—Gary O'Neill
(74) Attorney, Agent, or Firm—Oblon, Spivak, McClelland, Maier & Neustadt, P.C.

(57) ABSTRACT

An electrophoretic display constructed from an illumination unit, two control electrodes and a light-scattering microcompartment film. The electrophoretic display can be used as a display board, a computer display or a flat-panel display screen.

29 Claims, 5 Drawing Sheets

COMPOSITE SHEETS WITH ELECTRICALLY SWITCHABLE OPTICAL PROPERTIES MADE OF LIGHT-SCATTERING BASE MATERIAL

The invention relates to composite films having electrically switchable optical properties comprising light-scattering support materials based on electrophoretically mobile particles in a suspension liquid.

Information systems, such as, for example, signs, advertising boards, price indicators, timetable displays, computer displays or flat-panel display screens in general are used to display text, symbols or graphics. They should have high contrast, even in frontal lighting, be legible even at acute angles and have adequate inherent luminosity or have corresponding external illumination. The information displayed may be fixed, for example advertising hoardings, or electronically changeable, for example computer displays.

Many of these information systems have no inherent luminosity and are lit externally, for example by normal daylight or room light, front-lighting frequently being preferred owing to the reflection-free illumination.

An application of information systems which is of particularly outstanding commercial importance is in flat-panel display screens, as employed, for example, in portable computers. Flat-panel display screens are produced either using self-illuminating displays, which do not require an illumination system, or using non-self-illuminating displays, which operate, for example, on the basis of liquid crystals or electrophoretic systems. Non-self-illuminating displays are, in simplified terms, constructed from at least two layers: an illumination unit and a layer on which the electronically changeable information can be displayed, referred to here as the visualization layer. The illumination unit can be used as back- or front-lighting. The type of illumination unit is selected depending on the transparency and/or reflectivity of the visualization layer.

Description of the Illumination Units

The illumination unit must ensure the highest possible contrast for good lighting of the entire field of view. This can frequently only be achieved by means of high-power illumination units. However, the provision of the energy necessary for the latter requires corresponding high-power batteries, which are currently still associated with a considerable increase in the overall weight.

Illumination units of modern computer displays frequently consume over 90% of the energy to be used for the entire screen. In the back-lighting systems for liquid-crystal displays (LCDs), a considerable proportion of the light generated is filtered out by the polarization layers for example and is thus not available for the illumination.

In many cases, flat lamps or a multiplicity of lamps with corresponding light diffuser screens or meshes are employed for back-lighting systems of liquid-crystal displays (LCDs); other systems are based on an illumination unit with lateral introduction of the light into a waveguide plate and corresponding reflection units on the underside or excitable output points on the upper side of the waveguide plate. These techniques can only be used for back-lighting systems and not for front-lighting systems arranged between the visualization layer and the observer, since the emitted light is emitted both in the direction of the observer and toward the visualization layer, and it is therefore difficult, if at all possible, to distinguish the displayed information on the visualization layer.

Other display techniques use flat and thin electroluminescent lamps or small fluorescent units with a diffuser device. Although the electroluminescent lamps consume less energy than the fluorescent back-lighting systems, they are not as powerful and usually do not emit over the entire light spectrum necessary for the operation of color display screens. In addition, the life of electroluminescent lamps is unsatisfactory.

Description of the Visualization Layer

A novel development for the display of electronically changeable information is the "electronic ink" of Prof. J. Jacobson et al. This technique utilizes the alignment of single- or multicolor pigment particles in an electric field for the display of image information. Details can be obtained, for example, from J. Jacobson et al., IBM System Journal 36 (1997), pages 457–463, or B. Comiskey et al., Nature, Vol. 394, July 1998, pages 253–255.

For the preparation of corresponding bipolar, single- or two-color particles in various embodiments and their use in electrophoretic displays, reference is made, for example, to WO 98/03896, which describes how these particles are suspended in an inert liquid and encapsulated in small bubbles of a support material. This technique allows the macroscopic display of two colors by rotation of a two-color particle, depending on the applied electric field.

WO 98/19208 describes a similar electrophoretic display in which electrophoretically mobile particles in an optionally colored liquid can be moved within a microcapsule by an electric field. Depending on the field direction, the particles align to form an electrode and thus display macroscopically yes/no color information (either the color of the particles is visible or the color of the liquid is visible).

WO 98/41899 discloses electrophoretic displays which, although based on the principles described above, contain neither fluorescent nor reflective particles. In addition, the use of a suspension having liquid-crystalline behavior is also described. The liquid crystals block or facilitate electrophoretic migration of the particles, depending on the applied electric field.

WO 98/41898 likewise describes an electrophoretic display system of this type which can be produced, owing to its special arrangement, by a printing process, in particular by an ink-jet printing method. Both the electrodes and the electrophoretic display per se can advantageously be produced in successive printing steps.

It is a common feature of these techniques that the suspension liquid and the particles are embedded in capsules, bubbles or other cavities of a polymeric material. The particles can also be encapsulated with the suspension liquid; these capsules can then either be introduced in prefabricated form into the support material polymerization process or formed together with the support material in a complex emulsion polymerization. In neither case is the size or arrangement of the capsules or cavities uniform. Both the size and the two- or three-dimensional distribution of the microcapsules or cavities in the support material are subject to scatter which is difficult to control, firstly resulting in an inhomogeneous image information and secondly no making it difficult to achieve high contrast.

Systems of this type are, in particular, unsuitable for back-lighting since, due to their design, they are virtually opaque. In the case of simple illumination with visible incident light (front-lighting), the contrast is frequently unsatisfactory. Furthermore, the use of incident-light systems, i.e. with an external light source with visible light, makes it difficult to achieve uniformity of the illumination at the same time as continued good contrast.

The object of the present invention was to develop electrophoretic systems for the display of colors or information which have high luminosity and/or contrast at the same time as a flat design. The system should be thin and flexible in order to be able to be applied additionally to three-dimensional objects.

It has been found that a display system which uses electrophoretically mobile particles in cavities of a light-scattering microcompartment film has particularly high luminosity.

The present invention therefore relates to composite films having electrically switchable optical properties which are built up from two control electrodes and a microcompartment film having cavities containing electrophoretically mobile particles in a suspension liquid, where the microcompartment film consists of a light-scattering material.

Figure 1:
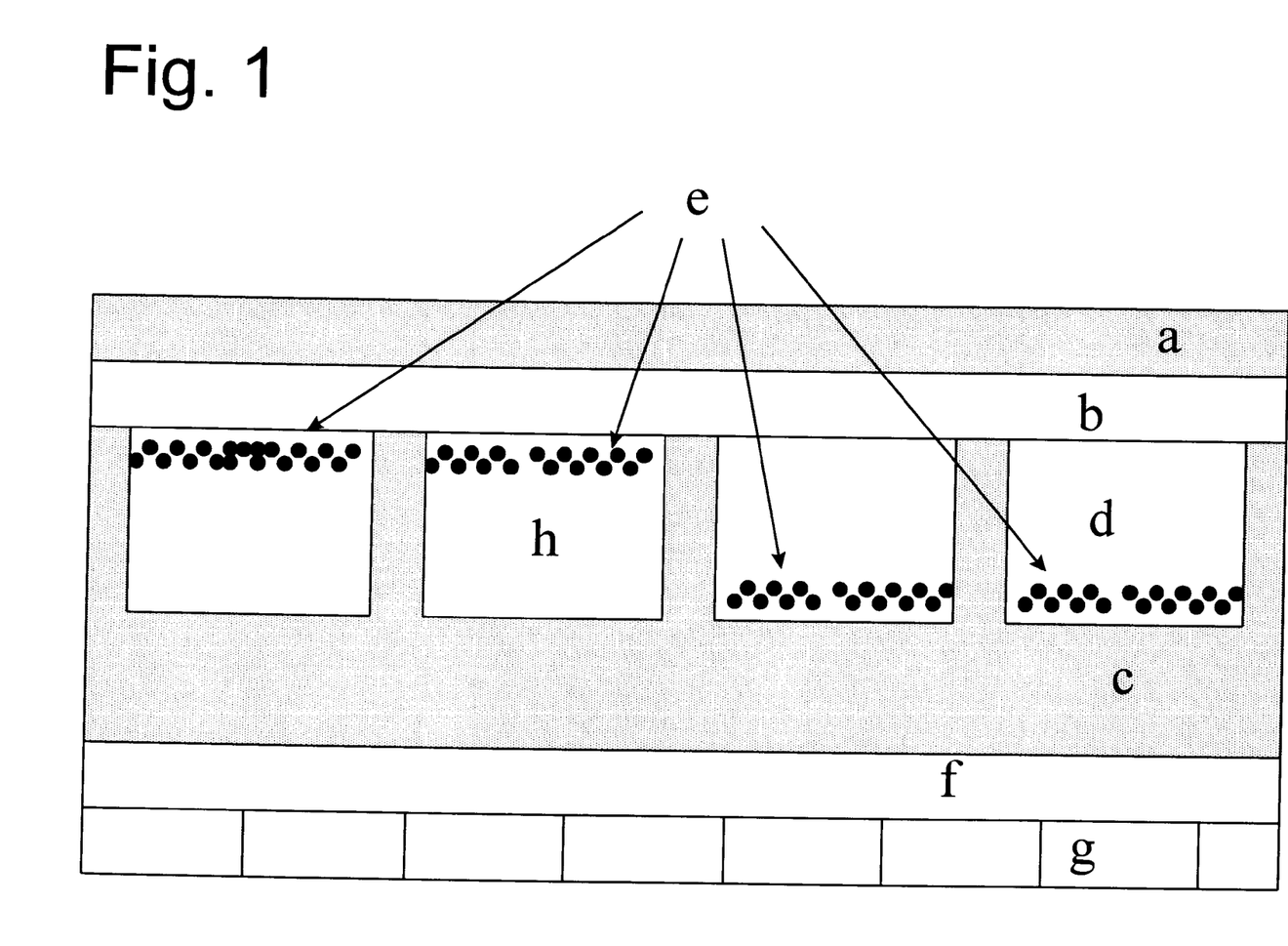

The structure of the composite film having electrically switchable optical properties according to the invention is shown in FIG. 1, in which:

a) denotes the transparent front electrode (control electrode)

b) denotes the transparent cover film c) denotes the light-scattering microcompartment film d) denotes cavities containing suspension liquid e) denotes electrophoretically mobile particles f) denotes the waveguide plate/film (illumination unit), optional g) denotes the addressing electrode (control electrode)

The transparent front electrode a) and the cover film b) may be arranged in the same or reverse sequence. If the addressing electrode g) is optically transparent, g) and the waveguide plate f) may also be interchanged.

In principle, the composite films according to the invention work as follows:

The light from the waveguide plate f) passes through the microcompartment film c) into the cavities. If the electrophoretically mobile particles are localized at the cover film b) (for example in cavity h) by the electric field applied between a) and g), no light escapes from the cavity. If the particles are localized at the waveguide plate (for example cavity d), the light can escape from the cavity unhindered.

The high luminosity of the composite films having electrically switchable optical properties according to the invention is based on the light-scattering material of the microcompartment film. This prevents light losses due to total internal reflection.

The light-scattering properties of the microcompartment film or composite film can be achieved by embedded scattering particles, as described in EP 0 645 420 or EP 0 590 471. A particularly suitable material for the production of the microcompartment film is FLEXIGLAS GS Clear 1001 or 2458 from Röhm GmbH, Darmstadt.

Figure 2:
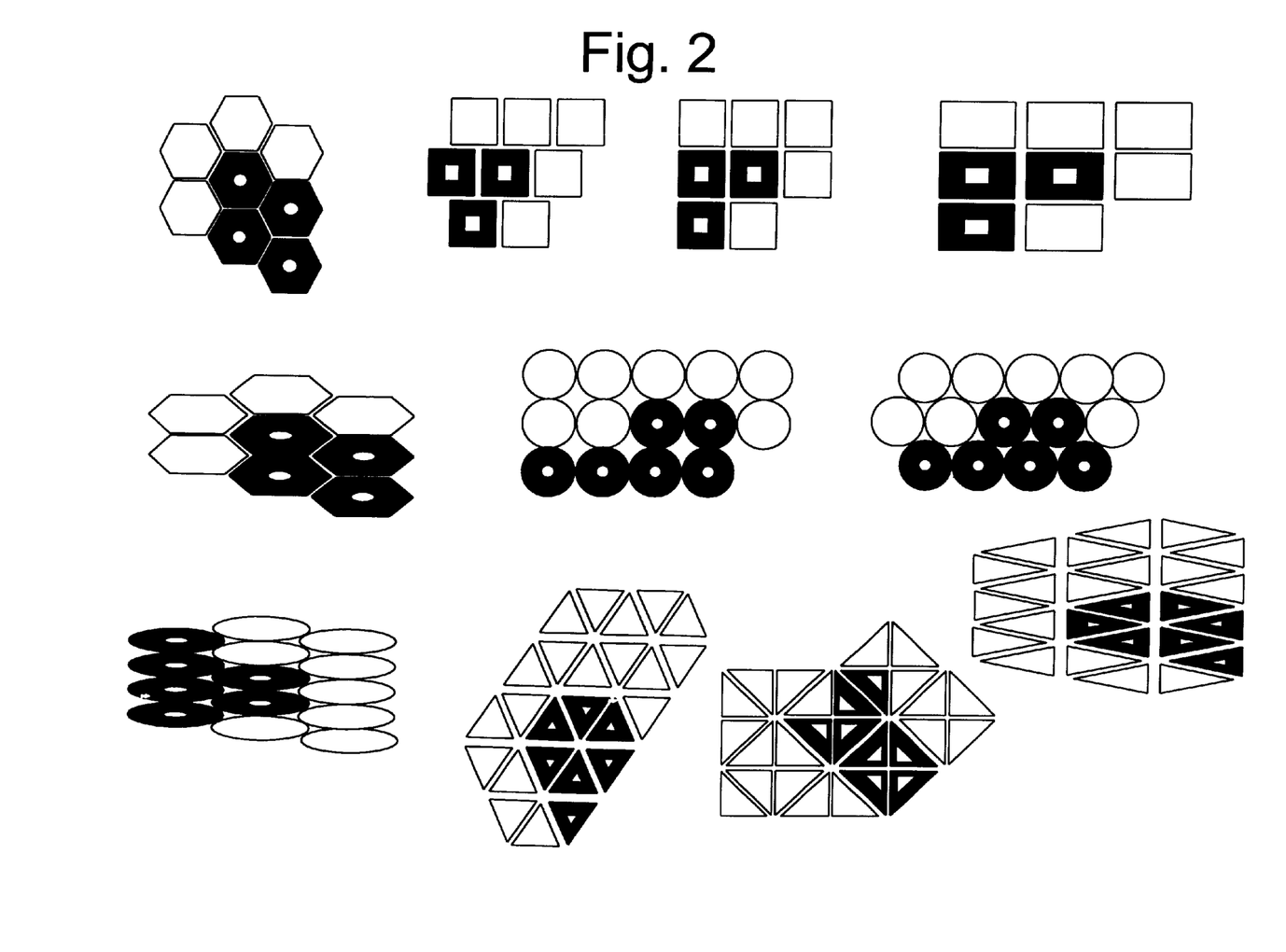

The arrangement of the cavities in the microcompartment film or composite film should be strictly regular. An arrangement in columns or rows is obvious. However, this arrangement need not necessarily be rectangular or even square, for example an inclined arrangement of the rows and columns or hexagonal arrangements of the cavities are also possible. FIG. 2 shows an illustrative selection.

The cavities can be introduced into a support material or into the microcompartment film by, for example, needles, embossing, 3D printing, erosion, etching, casting using casting compositions, injection molding, photographic or photolithographic processes or interference methods. Methods for the production of microstructured surfaces of this type are described, for example, in DE 29 29 313, WO 97/06468, U.S. Pat. No. 4,512,848, DE 41 35 676, WO 97/13633 or EP 0 580 052. Further methods for the production of small structures are described by Younan Xia and George M. Whitesides in Angew. Chem. 1998, 110, 568–594. These methods, known as "soft lithography", enable the production of very small structures in the range from below 1 $\mu$m to about 35 nm. A further method is micromilling of a master, which enables the production of plates or films having the desired microstructure. The master is a negative mold. Copies can then be molded in an embossing, casting or injection molding process.

Alternatively, an unstructured film can also be provided with cavities of the desired dimensions and shapes. Erosive or cutting methods, such as laser radiation or drilling/milling, for example using a CNC machine, are likewise suitable here.

The support material of the cavities should be optically transparent and may be colorless or colored. The control electrodes are in each case applied to the microcompartment film above and below the cavities, where the electrode (a in FIG. 1) arranged above the cavities, i.e. between the observer and the cavity, may of course be just as transparent as the support material. The control electrode (g in FIG. 1) applied below the cavities may also, in order to keep the electrode voltages low, be applied between the illumination unit (f in FIG. 1) and the cavities and should then be optically transparent.

Suitable support materials for the microcompartment film are all polymers which can be structured mechanically or lithographically, such as, for example, thermoplastics, polycarbonates, polyurethanes, polysiloxanes, polyolefins, such as, for example, polyethylene, polypropylene, COC (cycloolefinic copolymers), polystyrene, ABS polymers, PMMA, PVC, polyesters, polyamides, thermoplastic elastomers or crosslinking materials, such as UV-curing acrylate coatings, but also polytetrafluoroethylene, polyvinylidene fluoride or polymers of perfluoroalkoxy compounds, whether as homopolymers or copolymers or as a mixture constituent of a polymer blend. Through use of a flexible material for the microcompartment film, it is possible to provide the composite films according to the invention having electrically switchable optical properties with a flexible design.

The cavities of the microcompartment film can, apart from the depth profile in plan view, have any desired shape. FIG. 2 shows a selection. The cavities advantageously have a round, oval, triangular, rectangular, square, hexagonal or octagonal surface on the side facing the observer (visible surface).

The visible area of the cavities should be greater than 10,000 $\mu$m$^2$, preferably greater than 40,000 $\mu$m$^2$, particularly preferably greater than 62,500 $\mu$m$^2$ and very particularly preferably greater than 250,000 $\mu$m$^2$.

The depth of the cavities can be, independently of the visible area, between 20 and 250 $\mu$m, preferably between 30 and 200 $\mu$m, very particularly preferably between 50 and 100 $\mu$m.

The depth profile of the cavities may be uniform, i.e. the width of the cavities may be the same at all points.

In another embodiment of the present invention, the cavities have a conical or cone-like depth profile, with the ratio between the visible area of the cavities and the base area being greater than 1.5.

Figure 3:
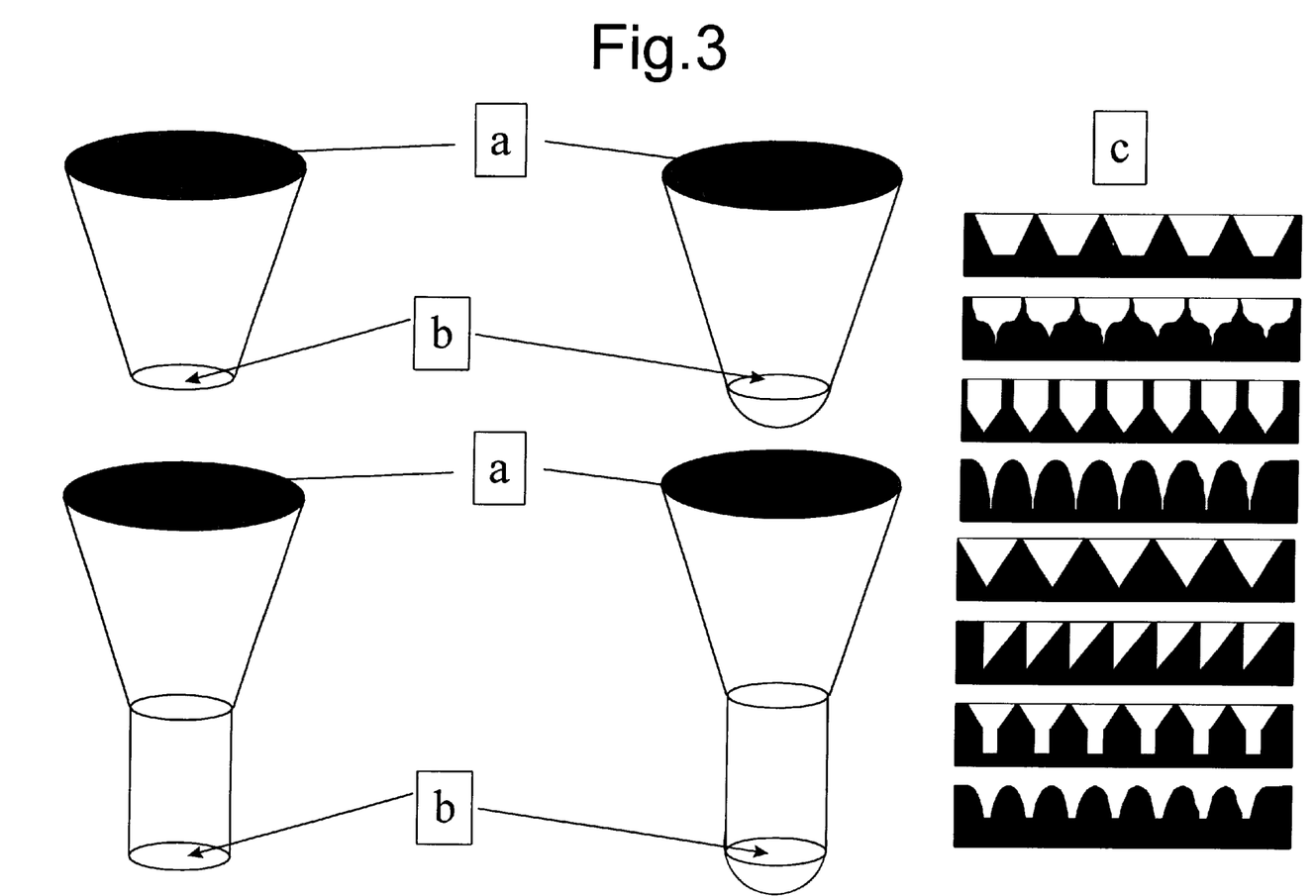

The conical or cone-like depth profile of the cavities is shown in FIG. 3. It is a particular feature of this embodiment of the present invention that the side of the cavities facing the observer ("visible area", a in FIG. 3) is greater than the side facing away from the observer ("base area", b in FIG. 3). The ratio between the visible area and the base area of the cavities should be greater than 1.5, preferably greater than 25, particularly preferably greater than 100, very particularly preferably greater than 250. FIG. 3, c, shows an illustrative selection of depth profiles.

The land widths between the individual cavities at the upper side of the microcompartment film should be kept as small as possible; preference is given to lands having a width of 2–50 μm, particularly preferably 5–25 μm. The land upper sides may be provided with an opaque coating. This prevents the undesired exit of light from the lands if the exit of light through the cavities is blocked by the particles.

In order to avoid light losses, the land upper sides and/or the waveguide plate may be mirrored or coated with a reflective material. Thus, for example, an aluminum lamination, metal vapor deposition or $TiO_2$ coating can be carried out.

After the microcompartment film has been provided with the desired cavities, the cavities are filled with the electrophoretically mobile particles and the suspension liquid. This can be carried out, for example, by introducing a slurry and removing the excess suspension by a knife coater, by direct application of the suspension by knife coater/spreader, by ink-jet printing methods or by self-filling by means of capillary forces. Through these measures, the particle suspensions are introduced directly into the cavities. The cavities must subsequently be encapsulated or sealed. In the case of filling by means of capillary forces, the capsules are necessarily sealed before the filling operation. This is advantageously effected by means of a cover film, which is connected to the microcompartment film or to the lands of the cavities in a leak proof manner. Diverse possibilities can be used for sealing the cavities, such as, for example:

- adhesive bonding or thermal melting (microwave warming, contact or friction welding, hot-melt adhesive, hot lamination)
- reactive resins, in particular UV-curing (for example acrylate dispersions) or 2-component systems (for example polyurethane coating systems) which are immiscible with the pigment suspension
- interfacial polymerization, interfacial polycondensation and other processes which are also used, for example, in the area of microencapsulation technologies, as described, for example, in "Microencapsulation: methods and industrial applications", Ed. S. Benita, Marcel Dekker, Inc., NY, 1996, for the encapsulation of spherical particles.

Figure 4:
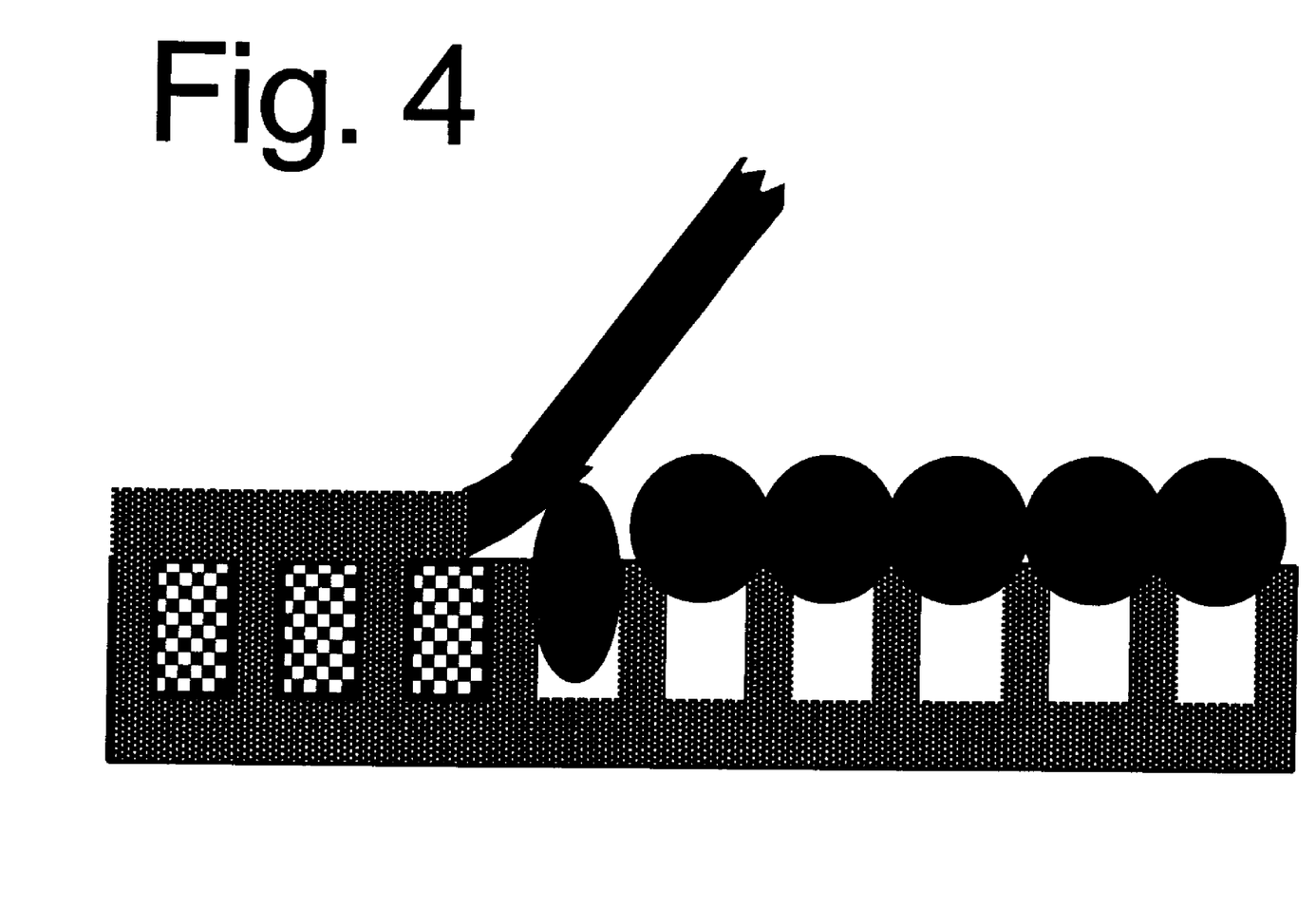

It is also possible to employ pre-encapsulated suspensions of electrophoretically mobile particles, i.e. prepared capsules. These prepared capsules can, as shown in FIG. 4, be pressed or forced into the cavities of the microcompartment film. The cavities filled in this way must subsequently be re-sealed, as already described, using a cover film. This technique significantly reduces the requirements on the stability of the capsule wall material for practical use given a matched ratio between the capsule size and the microcompartment size, since the capsules are surrounded by the lands of the microcompartment film. Furthermore, the arrangement of the capsules in the prepared cavities forces the capsules to align in a regular arrangement.

It is important in both variants that no air or other gas inclusions occur if possible during sealing, no reactions occur between the suspension medium or the microparticles of the suspension and the capsule layer, and there are no leaks to the environment or connections between the individual cavities.

The cavities or the prepared capsules can be filled with a single suspension or with a plurality of suspensions, for example suspensions having a color change on reversal of the applied electric field.

It is furthermore possible to omit coloring by the suspension, i.e. to fill the cavities with an optically transparent and colorless suspension liquid in addition to the particles. Examples of suitable optically transparent liquids are non-polar organic liquids, such as paraffin or isoparaffin oils or low-molecular-weight or low-viscosity silicone oils.

The suspension liquids may furthermore be optically transparent and colored. In order to produce multicolored displays, three adjacent cavities can contain differently colored (for example red, yellow and blue) suspension liquids.

It is furthermore possible to employ a suspension having a negative electrorheological effect.

With the aid of a suspension having a negative electrorheological effect, bistable composite films are obtained. On application of an electric field, the electrophoretically mobile particles line up in the field in accordance with their charge, i.e. the observer from outside perceives either the color of the particles or that of the suspension liquid. The particles are able to move unhindered in the suspension when an electric field is applied. If the electric field is removed, the viscosity of the electrorheological suspension increases greatly, and the particles are substantially fixed in the ordered state they have just assumed. The displayed information is correspondingly likewise fixed, so remaining visible in a stable manner even without an external electric field.

Colored suspensions must have a lightfast color and must not undergo any reactions with the material of the microcompartment film or of the cover layer. They may furthermore contain fluorescent or phosphorescent substances. The use of fluorescent or phosphorescent substances enables a higher light yield and/or the use of light sources having a UV radiation content. Cumarin 314T from Acros Organics or Pyromethene 580, for example, are suitable.

The electrophoretically mobile particles, which have a diameter of between 0.1 and 20 μm, preferably between 0.3 and 10 μm, particularly preferably between 0.4 and 5 μm, can be produced in accordance with WO 98/41898, WO 98/41899 or WO 98/0396. This includes the coating of the pigments with organic and/or polymeric materials and/or the use of the pure pigments which have been provided with electric charges, for example by treatment with charge-controlling additives (see, in particular, WO 98/41899).

The particles must be freely mobile in the suspension liquid in order that the particles can move to one of the electrodes owing to their charge, depending on the applied electric field. The "off"/"on" state of a cavity or the macroscopically perceptible color of the cavities is therefore determined by the spatial arrangement of the particles and can be controlled by the electric field.

If the particles are localized by the electric field at the side of the cavities facing away from the observer (base side, "b" in FIG. 3), the particles are invisible or virtually invisible to the observer, and the light from the illumination unit can pass virtually unhindered through the suspension liquid (for example FIG. 1, cavity d). If, on the other hand, the particles are localized on the side of the cavities facing the observer (viewing side, "a" in FIG. 3), they screen out the light from the illumination unit (for example FIG. 1, cavity h). A dark area results, with the light only able to exit through the lands of the support material. The lands of the microcompartment film should therefore be designed as thinly as possible and/or have an opaque or mirrored coating.

For addressing the cavities or particles, two electrodes (b and g in FIG. 1) are necessary, of which at least the electrode on the base area (g in FIG. 1) should be substantially transparent to the light from the illumination layer.

The addressing of the electrodes, i.e. in the extreme case the addressing of individual cavities, can be carried out, for example, by a row/column arrangement of switch units as described in WO 97/04398. If the cavities are too small for individual addressing, a plurality of cavities are switched by each switch unit.

The optional illumination unit (f in FIG. 1) should facilitate uniform illumination of the composite films having electrically switchable optical properties, but should nevertheless be flat. The use of side-mounted light sources whose light is distributed over the entire field of view by a waveguide plate is suitable here. Highly light-scattering plastic plates are disclosed, for example, in EP 0 645 420. These plates are constructed in such a way that total internal reflection of the incident light is prevented and instead diffraction of the light from the plate or, in the present invention, from the microcompartment film is facilitated. Further illustrative embodiments of waveguide plates are given in EP-A 0 645 420 and EP-0 590 471. These illumination systems are employed, for example, for back-lit signs. In a particular embodiment of the present invention, the material of the waveguide plate and the microcompartment film is identical.

Figure 5:
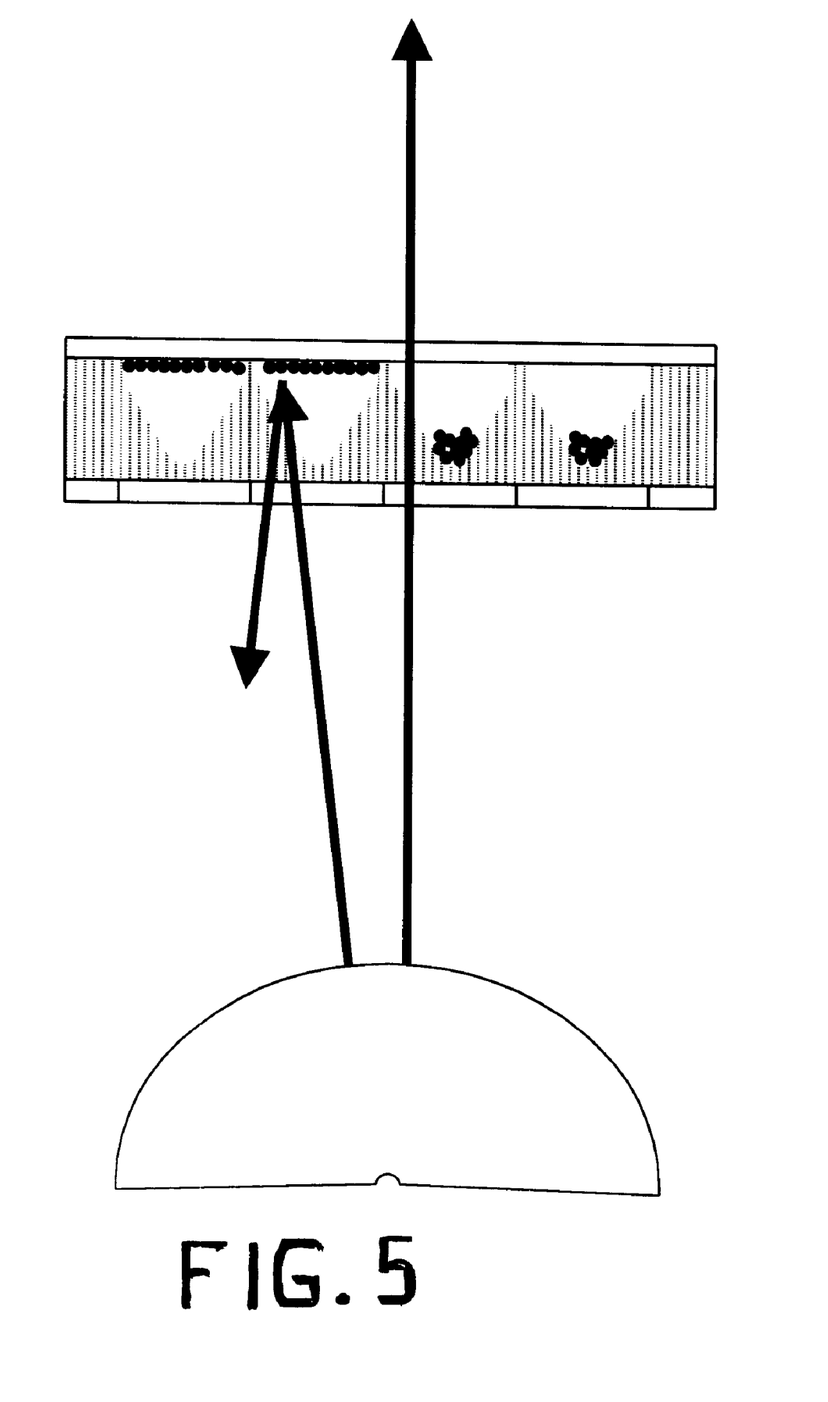

The optional illumination unit can be omitted if the composite film is applied to an illuminated background, which is then used as light source (backlight device) (FIG. 5). If the composite film is used as dimming device, i.e. on switchover from a transparent state to a non-transparent state, the illumination unit is likewise unnecessary.

Suitable waveguide plates or diffuser plates contain particles which are colorless, but have different refractive indexes, in a colorless matrix material. The propagation direction of the light rays entering the plate is thereby subjected to a slight constant change, and the light exits at a very small angle uniformly distributed over the plate surface. Such waveguide plates are advantageously illuminated from one edge, so that uniform light emission over the plate surfaces is achieved due to light refraction.

In order to achieve a uniform luminous density, light can be shone in at a plurality of edges of the illumination unit.

The composite films having electrically switchable optical properties according to the invention can be used for all display functions in which a flat design and/or high luminosity is important. Examples of such uses are, for example, display boards, cellphone displays, computers, flat-panel display screens, signs or signal boards. The composite films according to the invention can furthermore be used for the production of window panes, covers, greenhouse roofs, packaging, textiles, spectacles, headlamp covers, windscreens, signals or sun-protection devices.

What is claimed is:

1. An electrophoretic display constructed from an illumination unit, two control electrodes and a microcompartment film having cavities containing electrophoretically mobile particles in a suspension liquid, wherein the microcompartment film consists of a light-scattering material, and wherein the visible area of the cavities is greater than 250,000 $\mu m^2$.

2. A composite film as claimed in claim 1, wherein the suspension liquid is optically transparent and colorless.

3. A composite film as claimed in claim 1, wherein the suspension liquid is optically transparent and colored.

4. A composite film as claimed in claim 3, wherein each three adjacent cavities contain differently colored suspension liquids.

5. A composite film as claimed in claim 1, wherein the cavities have a conical or cone-like depth profile, the ratio between the visible area of the cavities and their base area being greater than 1.5.

6. A composite film as claimed in claim 1, wherein the visible area of the cavities is greater than 10,000 $\mu m^2$.

7. A composite film as claimed in claim 1, wherein the cavities have a depth of from 20 to 250 $\mu m$.

8. A composite film as claimed in claim 7, wherein the cavities have a depth of from 30 to 200 $\mu m$.

9. A composite film as claimed in claim 1, wherein the cavities in the microcompartment film are separated from one another at the upper side by lands having a width of 2 to 50 $\mu m$.

10. A composite film as claimed in claim 9, wherein the cavities in the microcompartment film are separated from one another at the upper side by lands having a width of from 2 to 25 $\mu m$.

11. A composite film as claimed in claim 9, wherein the land upper side of the microcompartment film is provided with an opaque coating.

12. A process for the production of a composite film having electrically switchable optical properties as claimed in claim 1, which comprises producing the cavities in the microcompartment film by erosive or cutting processes.

13. A process as claimed in claim 12, wherein the cavities in the microcompartment film are produced by erosive laser radiation.

14. A method of using an electrophoretic display as claimed in claim 1 for computer displays, flat-panel display screens, signs, signal boards or display boards.

15. The use of a composite film having electrically switchable optical properties according to claim 1 for the production of window panes, covers, greenhouse roofs, packaging, textiles, spectacles, headlamp covers, windscreens, signals or sunprotection devices.

16. An electrophoretic display constructed from an illumination unit, two control electrodes and a microcompartment film having cavities containing electrophoretically mobile particles in a suspension liquid, wherein the microcompartment film consists of a light scattering material, and wherein the cavities in the microcompartment film are separated from one another at-the upper side by lands having a width of 2 to 50 $\mu m$.

17. An electrophoretic display as claimed in claim 15, wherein the suspension liquid is optically transparent and colorless.

18. An electrophoretic display as claimed in claim 15, wherein the suspension liquid is optically transparent and colored.

19. An electrophoretic display as claimed in claim 17, wherein each three adjacent cavities contain differently colored suspension liquids.

20. An electrophoretic display as claimed in claim 15, wherein the cavities have a conical depth profile, where the ratio of the visible area of the cavities to their base area is greater than 1.5.

21. An electrophoretic display as claimed in claim 15, wherein the visible area of the cavities is greater than 10,000 $\mu m^2$.

22. An electrophoretic display as claimed in claim 20, wherein the visible area of the cavities is greater than 250,000 $\mu m^2$.

23. An electrophoretic display as claimed in claim 15, wherein the cavities have a depth of from 20 to 250 $\mu m$.

24. An electrophoretic display as claimed in claim 22, wherein the cavities have a depth of from 30 to 200 µm.

25. An electrophoretic display as claimed in claim 15, wherein the cavities in the microcompartment film are separated from one another at the upper side by lands having a width of from 2 to 25 µm.

26. An electrophoretic display as claimed in claim 15, wherein the land upper side of the microcompartment film is provided with an opaque coating.

27. A process for the production of an electrophoretic display as claimed in claim 15, which comprises producing the cavities in the microcompartment film by erosive or cutting processes.

28. A process of the production of an electrophoretic display as claimed in claim 26, wherein the cavities in the microcompartment film are produced by erosive laser radiation.

29. A method of using an electrophoretic display as claimed in claim 15 for computer displays, flat-panel display screens, signs, signal boards or display boards.

* * * * *